Oct. 16, 1928.
A. C. HOECKER
1,687,837
PISTON FOR INTERNAL COMBUSTION MOTORS
Filed Jan. 28, 1925
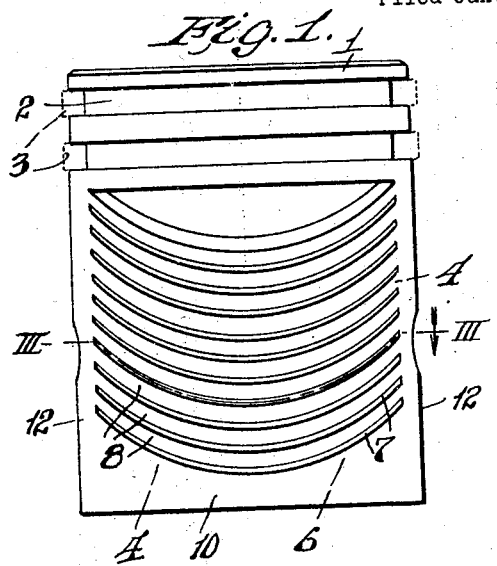
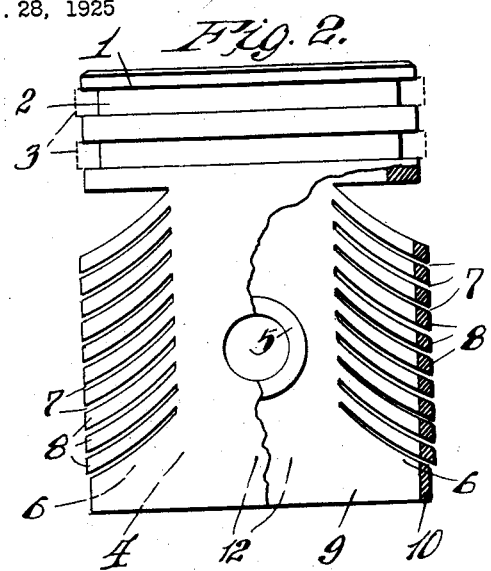
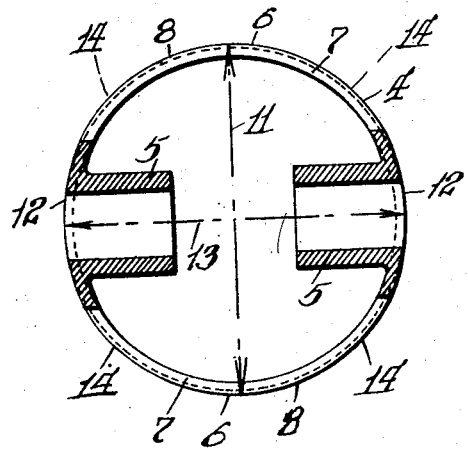
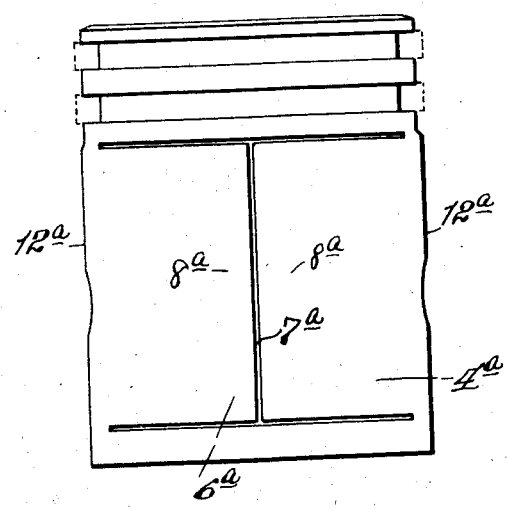
Inventor.
Albert C. Hoecker.
By H G Ritther
atty.

Patented Oct. 16, 1928.

1,687,837

UNITED STATES PATENT OFFICE.

ALBERT C. HOECKER, OF ST. LOUIS, MISSOURI, ASSIGNOR OF ONE-THIRD TO PAUL F. KRAUSE, OF ST. LOUIS, MISSOURI.

PISTON FOR INTERNAL-COMBUSTION MOTORS.

Application filed January 28, 1925. Serial No. 5,214.

This invention relates to an improvement in pistons for internal combustion motors and has for its primary object, the purpose of providing improvements in the skirt of the piston for allowing for the thermal expansion of the piston.

Another object of the invention is in providing the skirt of the piston with improved means for eliminating back-slap.

A further object of the invention is in providing the skirt of the piston with a series of transversely disposed slots which extend through the thickness of the skirt wall.

A still further object of the invention is in providing the piston skirt with transversely disposed arcuate portions which are adapted to move towards the open end of the skirt by the pressure of the cylinder wall under heated conditions of the cylinder and piston.

Other and further objects will appear in the specification and be specifically pointed out in the appended claims, reference being had to the accompanying drawings exemplifying the invention, and in which, Fig. 1 is a side elevation of the thrust side of this improved piston.

Fig. 2 is a side elevation of the pin bearing side of the piston partly shown in section.

Fig. 3 is a horizontal section taken on the line III—III of Fig. 1.

Fig. 4 is a side elevation of a piston bearing a modified improvement in the thrust side of the piston.

With reference to the accompanying drawings, 1 designates the closed end of the piston having the usual packing ring recesses 2 for the reception of the packing rings 3 and extending from the closed end 1 is the skirt 4, having oppositely disposed pin bosses 5 which extend inwardly from the skirt wall.

Oppositely disposed from one another and at right-angles to the pin bosses 5, are the thrust sides 6 of the piston which are a part of the skirt 4, each of said thrust sides 6 being provided with a series of transversely disposed arcuate slots 7 which provide separate cylinder engaging portions 8. The arcuate slots 7 are disposed so that the separated portions 8 will extend downwardly towards the open end 9 of the skirt so that said portions can be forced downwardly by a pressure exerted thereto from the cylinder wall.

The lower portion 10 of the skirt is turned down to a diameter less than is the diameter of the skirt taken across the thrust sides of the piston as indicated by the dotted line 11 in Fig. 3. Whereas, the diameter of the skirt taken across the pin bearing sides 12 of the piston on the line 13 in Fig. 3 is approximately equal to the diameter of the portion 10, the periphery of the pin bearing sides 12 of the skirt being tapered off as designated at 14 in Fig. 3 to meet the cylinder bearing periphery of the thrust sides 6 of the skirt.

This improved piston when adapted for a particular cylinder is made to a size wherein the periphery of the separated portions 8 of the thrust sides 6 will snugly engage opposite sides of the cylinder, whereas, the lower portion 10 of the skirt and the pin bearing sides 12 thereof will be short of engaging the cylinder wall when the piston and cylinder is in a cool condition.

In the operation of this improved piston, when heated conditions are brought about relative to the cylinder and piston, the separated portions 8 which originally engaged the cylinder wall when the cylinder was cool, will be forced downwardly towards the open end 9 of the piston and at the same time the lower portion 10 and pin bearing portions 12 of the skirt, will expand to an approximate fitting relation with the cylinder, said portions 8, 10 and 12 at no time too tightly engaging the cylinder wall on account of the fact that the portions 8 are resilient and are forced downwardly by the cylinder wall pressure, while the portions 10 and 12 are turned or ground to diameters wherein the maximum expansion thereof will be no greater than to properly engage the cylinder wall under maximum thermal conditions of the cylinder and piston.

On account of the resiliency provided by the oppositely disposed portions 8 which are formed on the thrust sides of the piston, it is obvious that the back-slap of the piston ordinarily created by the connecting rod throw, will be eliminated on account of the fact that said portions 8 at all times engage the cylinder wall.

The modified structure disclosed in Fig. 4 will function similar to the structure of Figs. 1, 2 and 3 as the thrust sides 6ª of the piston are provided with respective I-shaped slots 7ª thereby forming separated portions 8ª, the diameter of the piston across the pin bearing sides 12ª being less than the diameter across thrust sides 6ª of the structure 4ª.

What I claim is:—

1. A piston having a head and a skirt, said skirt having a series of transverse slots formed therein extending at an angle to the vertical axis of the piston, thereby providing a series of separated portions in the entire skirt length.

2. A piston having a head and a skirt, said skirt having a series of transverse slots formed therein extending at an angle to the vertical axis of the piston thereby providing a series of separated portions which are adapted to both inward and outward movement.

3. A piston having a head and a skirt, said skirt having a series of transverse slots extending at an angle to the vertical axis of the piston thereby providing a series of separated portions which are adapted to inward movement by the pressure of the cylinder wall of the cylinder in which the piston is operating.

4. A piston having a head and a skirt, said skirt having a series of transversely extending arcuate slots formed at an angle to the vertical axis of the piston.

5. A piston having a head and a skirt, said skirt having a series of transversely extending arcuate slots formed in opposite disposition to one another, said slots extending at an angle to the vertical axis of the piston.

6. A piston having a head and a skirt, said skirt having a series of transversely extending arcuate slots formed therein disposed angular to the vertical axis of the piston and in opposite disposition to one another, thereby providing a series of separated portions which extend the entire length of the skirt.

ALBERT C. HOECKER